US012354298B2

(12) United States Patent
Goto et al.

(10) Patent No.: US 12,354,298 B2
(45) Date of Patent: Jul. 8, 2025

(54) IMAGE PROCESSING APPARATUS AND VEHICLE

(71) Applicant: SUBARU CORPORATION, Tokyo (JP)

(72) Inventors: Yusuke Goto, Tokyo (JP); Minoru Kuraoka, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 314 days.

(21) Appl. No.: 17/942,241

(22) Filed: Sep. 12, 2022

(65) Prior Publication Data

US 2023/0098659 A1 Mar. 30, 2023

(30) Foreign Application Priority Data

Sep. 24, 2021 (JP) .................................. 2021-155975

(51) Int. Cl.
*G06T 7/70* (2017.01)
*G05D 1/00* (2006.01)
(Continued)

(52) U.S. Cl.
CPC ............... *G06T 7/70* (2017.01); *G05D 1/021* (2013.01); *G06T 3/60* (2013.01); *G06V 10/443* (2022.01);
(Continued)

(58) Field of Classification Search
CPC .... G06T 7/60; G06T 7/68; G06T 7/70; G06T 3/60; G06T 2207/20081; G06T 7/10;
(Continued)

(56) References Cited

U.S. PATENT DOCUMENTS

2009/0202145 A1* 8/2009 Yokono .................. G06V 40/10
382/160
2014/0226908 A1* 8/2014 Nomoto ................. G06V 10/44
382/203
(Continued)

FOREIGN PATENT DOCUMENTS

JP 2016-197389 A 11/2016

OTHER PUBLICATIONS

Office Action issued in Japanese Patent Application No. 2021-155975 dated Jun. 3, 2025. (with English translation).

*Primary Examiner* — Oneal R Mistry
*Assistant Examiner* — Duy Tran
(74) *Attorney, Agent, or Firm* — TROUTMAN PEPPER LOCKE LLP

(57) ABSTRACT

An image processing apparatus includes an extractor and an object identifier. The extractor is configured to extract a feature quantity included in a captured image. The object identifier is configured to perform identification of an object on the basis of the feature quantity. The extractor is configured to extract the feature quantity by performing, on the captured image, a convolution calculation multiple times using a filter including multiple filter values that are two-dimensionally arranged. The multiple filter values are initially set at values that are line-symmetric with respect to an axis of symmetry along a predetermined direction. Augmentation batch data of learning data to be used in an update process of the filter by machine learning is configured to include any unflipped image extracted and a flipped image as paired images, the flipped image resulting from applying image-flipping to the unflipped image with respect to the axis of symmetry.

5 Claims, 14 Drawing Sheets

(51) Int. Cl.
    *G05D 1/02*     (2020.01)
    *G06T 3/60*     (2024.01)
    *G06V 10/44*    (2022.01)
    *G06V 20/56*    (2022.01)

(52) U.S. Cl.
    CPC .... *G06V 20/56* (2022.01); *G06T 2207/20081* (2013.01)

(58) Field of Classification Search
    CPC .......... G06T 7/215; G06T 2207/20212; G06T 2207/20024; G06T 2219/2016; G06V 10/44; G06V 10/443; G06V 20/56; G06V 20/58; G06V 30/146; G06V 30/1463; G06V 30/1473; G06V 30/18; G06V 10/96; G06V 10/70; G06V 10/22; G06V 10/242; G06V 30/19013; B60W 2554/40; B60W 2554/80; B60W 2420/40; B60W 2554/4049; B60W 2420/403
    See application file for complete search history.

(56) References Cited

U.S. PATENT DOCUMENTS

| | | | |
|---|---|---|---|
| 2015/0030251 A1* | 1/2015 | Hasegawa | G06V 20/584 382/195 |
| 2017/0132515 A1 | 5/2017 | Yokoi et al. | |
| 2018/0032837 A1* | 2/2018 | Hiroike | G06V 40/171 |
| 2019/0362178 A1* | 11/2019 | Huang | G06T 7/136 |
| 2019/0370609 A1* | 12/2019 | Akiyama | G06V 10/454 |
| 2020/0285894 A1* | 9/2020 | El-Khamy | G06F 18/214 |

* cited by examiner

COMPARATIVE EXAMPLE 1

EXAMPLE

| |
|---|
| CONVOLUTION CALCULATION (7x7) — CN |
| ACTIVATION FUNCTION (Tanh) — CA |
| CONVOLUTION CALCULATION (5x5) |
| ACTIVATION FUNCTION (Tanh) |
| CONVOLUTION CALCULATION (3x3) |
| ACTIVATION FUNCTION (Tanh) |
| CONVOLUTION CALCULATION (3x3) |
| ACTIVATION FUNCTION (Tanh) |
| CONVOLUTION CALCULATION (3x3) |
| ACTIVATION FUNCTION (Tanh) |
| CONVOLUTION CALCULATION (3x3) |
| ACTIVATION FUNCTION (Tanh) |
| CONVOLUTION CALCULATION (3x3) |
| ACTIVATION FUNCTION (Tanh) |
| CONVOLUTION CALCULATION (3x3) |
| ACTIVATION FUNCTION (Tanh) |
| CONVOLUTION CALCULATION (3x3) |
| ACTIVATION FUNCTION (Tanh) |
| CONVOLUTION CALCULATION (4x4) — CN |
| ACTIVATION FUNCTION (Tanh) — CA |
| Softmax |

FIG. 16

IMAGE PROCESSING APPARATUS AND VEHICLE

CROSS-REFERENCE TO RELATED APPLICATION

The present application claims priority from Japanese Patent Application No. 2021-155975 filed on Sep. 24, 2021, the entire contents of which are hereby incorporated by reference.

BACKGROUND

The technology relates to an image processing apparatus that performs object recognition on the basis of a captured image, and to a vehicle including the image processing apparatus.

A captured image obtained by an imaging apparatus includes images of various objects. For example, Japanese Unexamined Patent Application Publication No. 2016-197389 discloses an image processing apparatus that performs object recognition on the basis of such a captured image.

SUMMARY

An aspect of the technology provides an image processing apparatus including an extractor and an object identifier. The extractor is configured to extract a feature quantity included in a captured image. The object identifier is configured to perform identification of an object on the basis of the feature quantity. The extractor is configured to extract the feature quantity by performing, on the basis of the captured image, a convolution calculation multiple times using a filter including multiple filter values that are two-dimensionally arranged. The multiple filter values of the filter are initially set at values that are line-symmetric with respect to an axis of symmetry along a predetermined direction. Augmentation batch data of learning data to be used in an update process of the filter by machine learning is configured to include any unflipped image extracted and a flipped image as paired images, the flipped image resulting from applying image-flipping to the unflipped image with respect to the axis of symmetry.

An aspect of the technology provides a vehicle including an image processing apparatus and a vehicle control processor. The image processing apparatus includes an extractor and an object identifier. The extractor is configured to extract a feature quantity included in a captured image. The object identifier is configured to identify an object on the basis of the feature quantity. The extractor is configured to extract the feature quantity by performing, on the basis of the captured image, a convolution calculation multiple times using a filter including multiple filter values that are two-dimensionally arranged. The multiple filter values of the filter are initially set at values that are line-symmetric with respect to an axis of symmetry along a predetermined direction. Augmentation batch data of learning data to be used in an update process of the filter by machine learning is configured to include any unflipped image extracted and a flipped image as paired images, the flipped image resulting from applying image-flipping to the unflipped image with respect to the axis of symmetry. The vehicle control processor is configured to perform vehicle control on the basis of a result of the identification of the object by the object identifier.

An aspect of the technology provides an image processing apparatus including circuitry configured to extract a feature quantity included in a captured image, and identify an object on the basis of the feature quantity. The circuitry is configured to extract the feature quantity by performing, on the basis of the captured image, a convolution calculation multiple times using a filter including multiple filter values that are two-dimensionally arranged. The multiple filter values of the filter are initially set at values that are line-symmetric with respect to an axis of symmetry along a predetermined direction. Augmentation batch data of learning data to be used in an update process of the filter by machine learning is configured to include any unflipped image extracted and a flipped image as paired images, the flipped image resulting from applying image-flipping to the unflipped image with respect to the axis of symmetry.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIG. 16 is a schematic diagram illustrating a configuration example of a machine learning model according to one Example.

DETAILED DESCRIPTION

Figure 1:
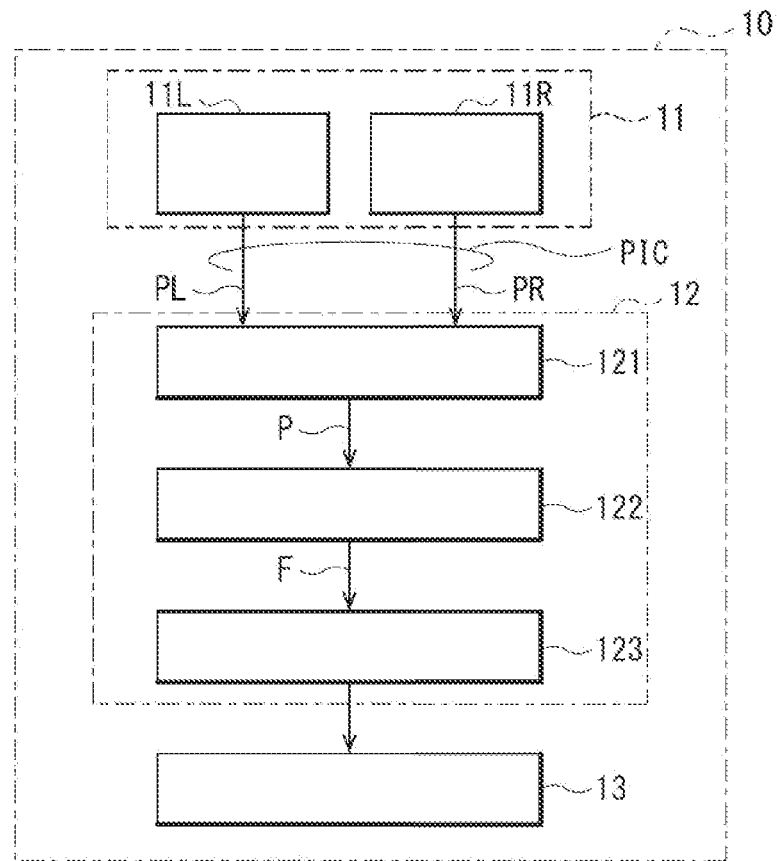
FIG. 1 is a block diagram illustrating a schematic configuration example of a vehicle according to one example embodiment of the technology.

What is demanded of an image processing apparatus that performs object recognition on the basis of a captured image is to achieve lightness of a processing model and to secure symmetry of performance (i.e., model performance).

It is desirable to provide an image processing apparatus that makes it possible to secure symmetry of performance while achieving lightness of a processing model, and to provide a vehicle including such an image processing apparatus.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings. It is to be noted that the description is given in the following order.

Example Embodiment (an Example of Initial Setting and an Update Process of a Filter in Performing a Convolution Calculation)

Example (an Example Result of Object Recognition)

Modification Example

Figure 2:
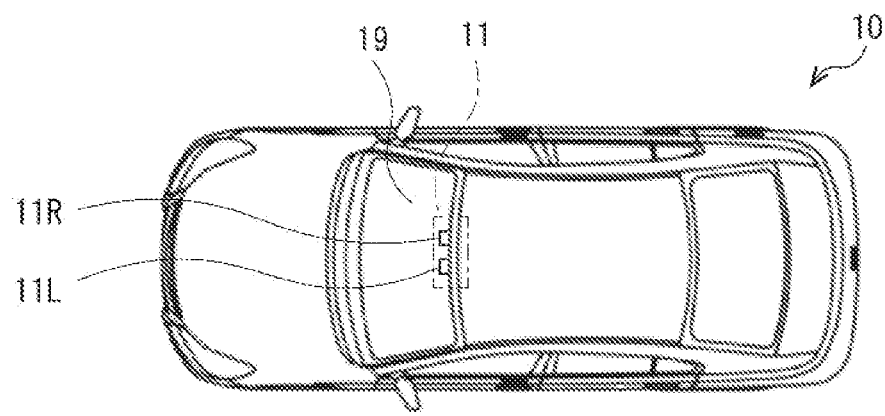
FIG. 2 is a top plan diagram schematically illustrating an outer configuration example of the vehicle illustrated in FIG. 1.

FIG. 1 is a block diagram illustrating a schematic configuration example of a vehicle (a vehicle 10) according to an example embodiment of the technology. FIG. 2 is a top plan diagram schematically illustrating an outer configuration example of the vehicle 10 illustrated in FIG. 1.

As illustrated in FIG. 1, the vehicle 10 may include a stereo camera 11, an image processing apparatus 12, and a vehicle control processor 13. Note that FIG. 1 omits the illustration of other components including a power source, such as an engine and a motor, of the vehicle 10. For example, the vehicle 10 may be an electrically driven vehicle such as a hybrid electric vehicle (HEV) or an electric vehicle (EV), or may be a gasoline vehicle.

As illustrated in FIG. 2, for example, the stereo camera 11 may capture images of the front view from the vehicle 10 to thereby generate paired images, e.g., a left image PL and a right image PR, having respective parallaxes. As illustrated in FIGS. 1 and 2, the stereo camera 11 may include a left camera 11L and a right camera 11R.

The left camera 11L and the right camera 11R may each include, for example, a lens and an image sensor. As illustrated in FIG. 2, for example, the left camera 11L and the right camera 11R may be disposed in the vicinity of an upper part of a windshield 19 of the vehicle 10 and spaced from each other by a predetermined distance in the width direction of the vehicle 10. The left camera 11L and the right camera 11R may perform imaging operations in synchronization with each other. For example, as illustrated in FIG. 1, the left camera 11L may generate the left image PL, and the right camera 11R may generate the right image PR. The left image PL and the right image PR may each include multiple pixel values. The left image PL and the right image PR may constitute a stereo image PIC, as illustrated in FIG. 1.

Figure 3:
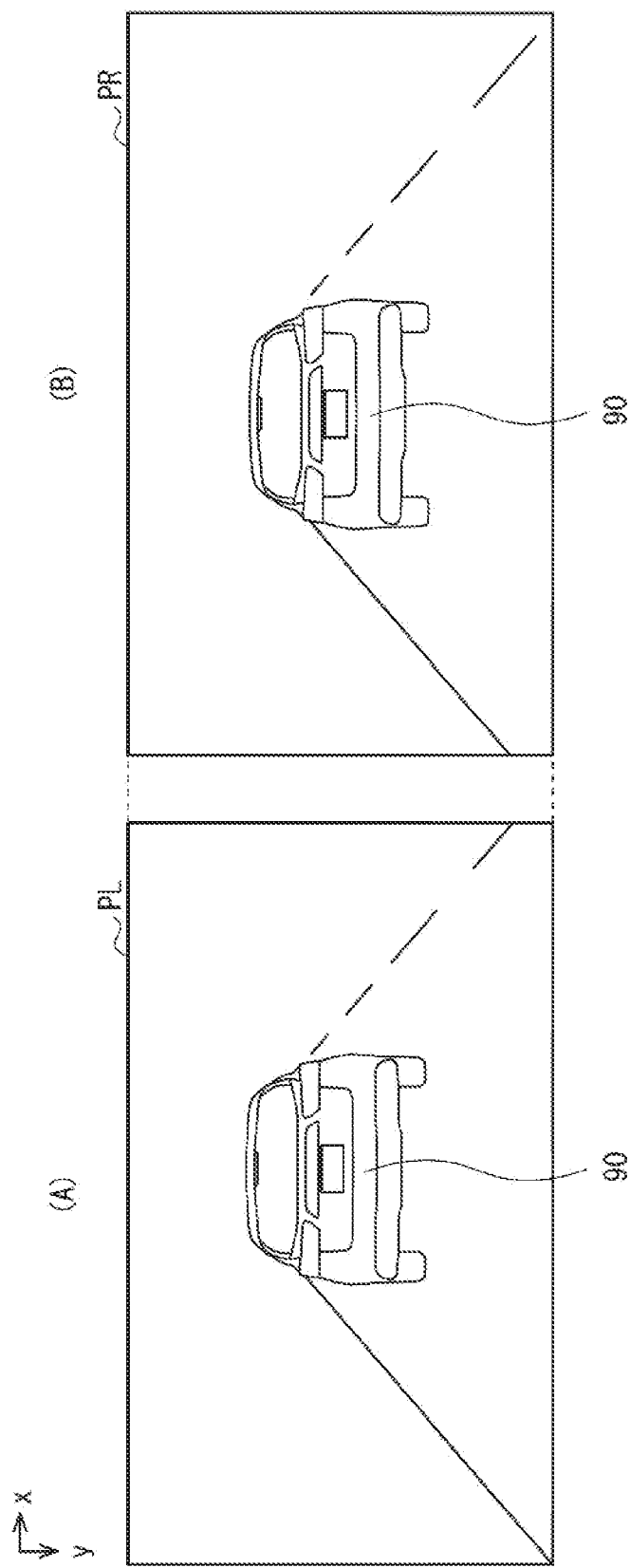
FIG. 3 is a schematic diagram illustrating an example of a left image and a right image generated by a stereo camera illustrated in FIG. 1.

FIG. 3 illustrates an example of the stereo image PIC. Part (A) of FIG. 3 illustrates an example of the left image PL, and part (B) of FIG. 3 illustrates an example of the right image PR. Note that x and y in FIG. 3 represent an x-axis and a y-axis, respectively. In this example, another vehicle (e.g., a preceding vehicle 90) is traveling ahead of the vehicle 10 on the same traveling road. The left camera 11L may capture an image of the preceding vehicle 90 to generate the left image PL. The right camera 11R may capture an image of the preceding vehicle 90 to generate the right image PR.

The stereo camera 11 mat generate the stereo image PIC including the left image PL and the right image PR. The stereo camera 11 may perform the imaging operations at a predetermined frame rate, such as 60 fps, to generate a series of stereo images PIC.

The image processing apparatus 12 may perform various image processing, including a process of recognizing an object present ahead of the vehicle 10, on the basis of the stereo images PIC received from the stereo camera 11. As illustrated in FIG. 1, the image processing apparatus 12 may include an image memory 121, a feature quantity extractor 122, and an object identifier 123.

The image processing apparatus 12 may include one or more processors or central processing units (CPUs) each executing a program, and one or more memories communicably coupled to the one or more processors. The memories may each include, for example, a random-access memory (RAM) that temporarily holds processing data, and a read-only memory (ROM) that contains the program.

In one embodiment, the feature quantity extractor 122 may serve as an "extractor".

As illustrated in FIG. 1, the image memory 121 may temporarily hold the left image PL and the right image PR included in the stereo image PIC. The image memory 121 may sequentially supply the left image PL, the right image PR, or both stored therein, each as a captured image P (see FIG. 1) to the feature quantity extractor 122.

The feature quantity extractor 122 extracts a feature quantity F (see FIG. 1) included in one or more image regions R in the captured image P (here, either one of the left image PL and the right image PR) read from the image memory 121. The feature quantity F may include pixel values of multiple pixels that are two-dimensionally arranged, or arranged in a matrix, as will be described in detail later with reference to FIG. 7. Examples of the feature quantity F include red, green, and blue (RGB) feature quantities and histograms of oriented gradients (HOG) feature quantities.

As will be described in detail later, the feature quantity extractor 122 may define the one or more image regions R described above in the captured image P and extract the feature quantity F by using a trained model such as a trained deep neural network (DNN), that is, by using machine learning. In defining the image region R, the feature quantity extractor 122 may, for example, recognize an object in the captured image P and output the coordinates of the recognized object to thereby define a rectangular region as the image region R.

Figure 4:
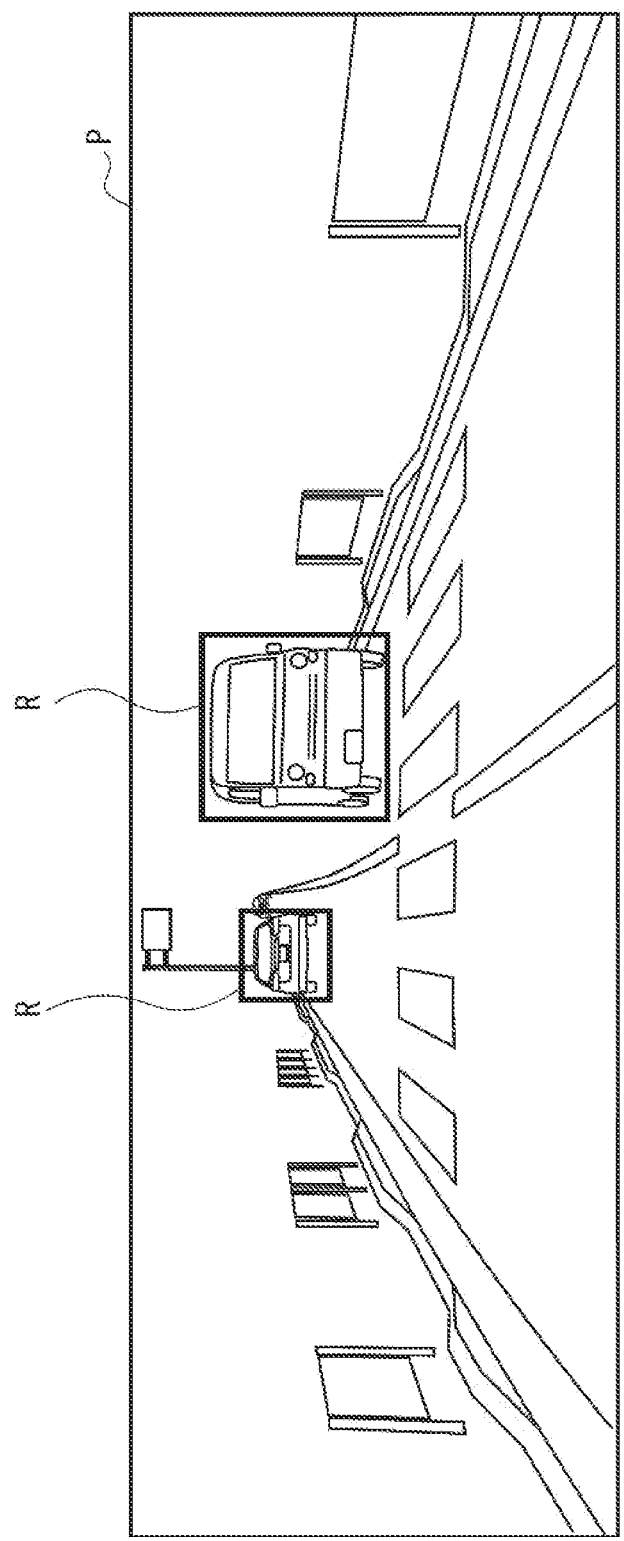
FIG. 4 is a schematic diagram illustrating an example of image regions defined in a captured image.

FIG. 4 schematically illustrates an example of the image region R. In the example illustrated in FIG. 4, two image regions R may be defined for two vehicles, respectively, in the captured image P. Although the image regions R may be defined for vehicles in this example, this is non-limiting. For example, the image regions R may be defined for other objects including, without limitation, humans, guardrails, and walls.

Here, with reference to FIGS. 5 to 8, a detailed description will be given of an extraction process of the feature quantity F included in the captured image P (i.e., in the one or more image regions R) to be performed by the feature quantity extractor 122.

Figure 5:
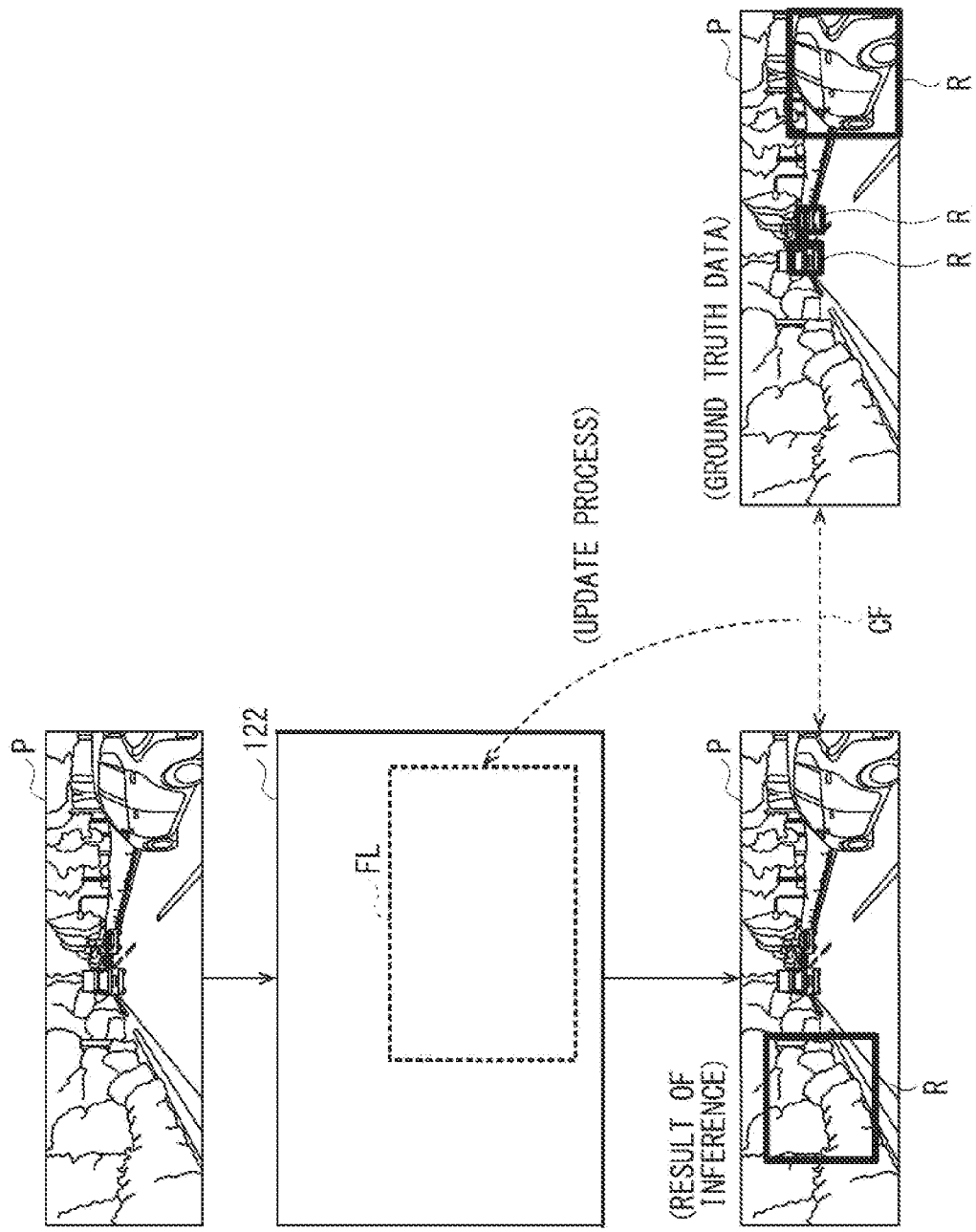
FIG. 5 is a schematic diagram describing an outline of an update process of a filter to be used in a convolution calculation.
Figure 6:
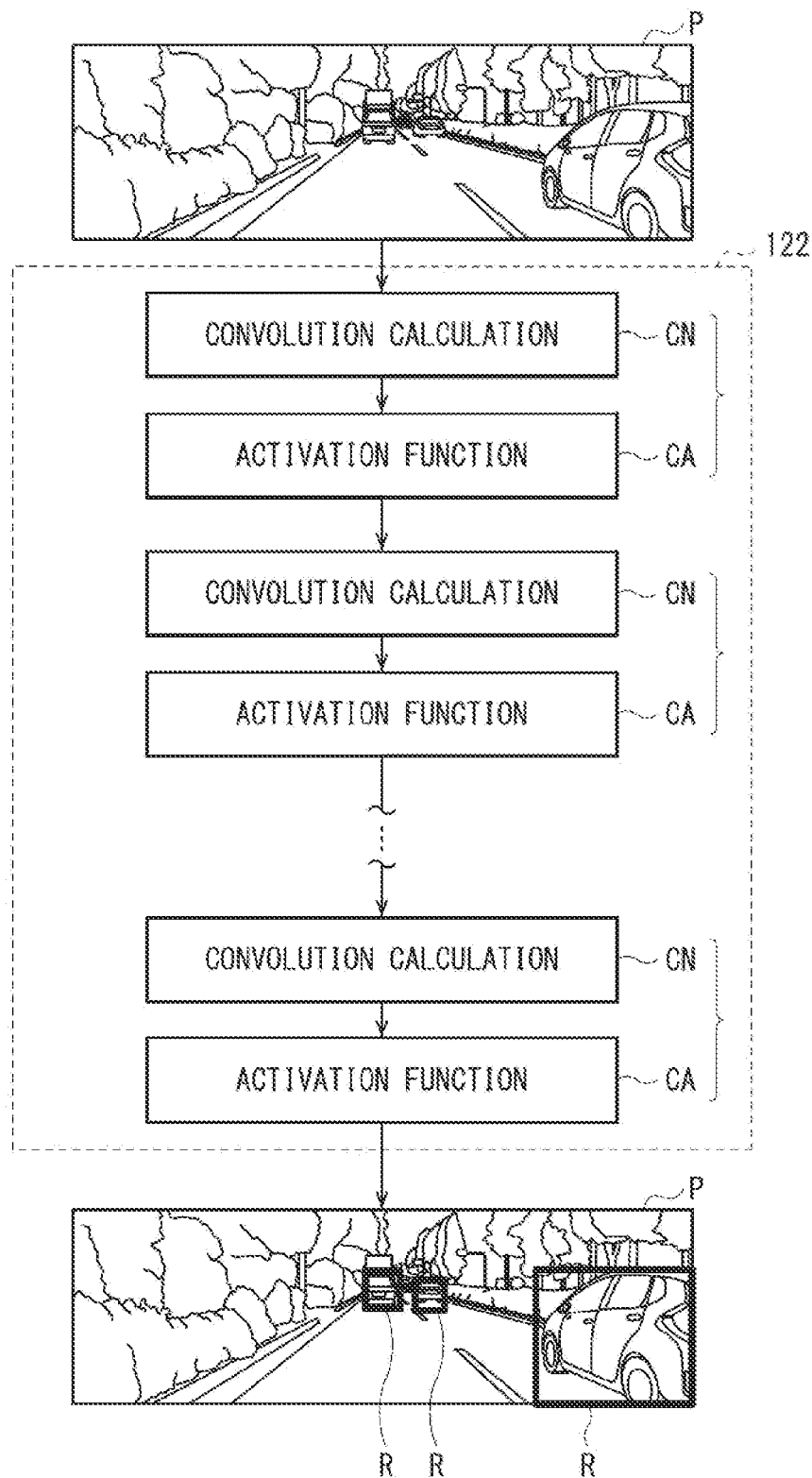
FIG. 6 is a schematic diagram illustrating an application example of the convolution calculation and an activation function at a feature quantity extractor illustrated in FIG. 1.
Figure 7:
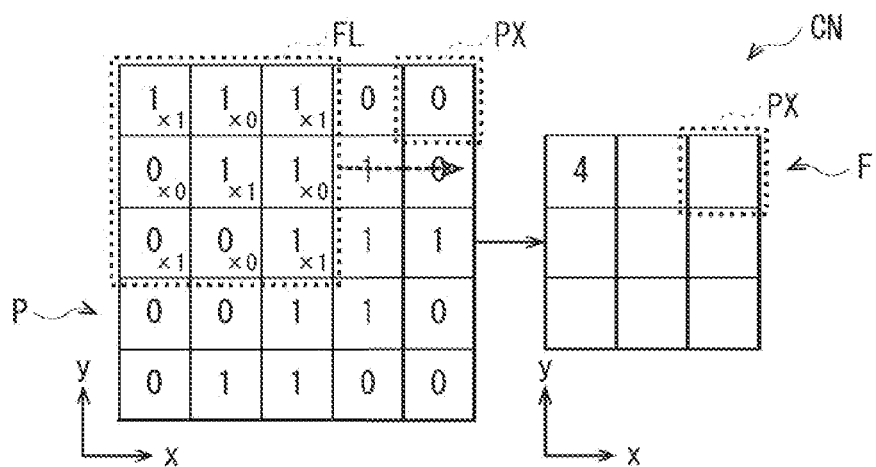
FIG. 7 is a schematic diagram illustrating an example process of the convolution calculation illustrated in FIG. 6.
Figure 8:
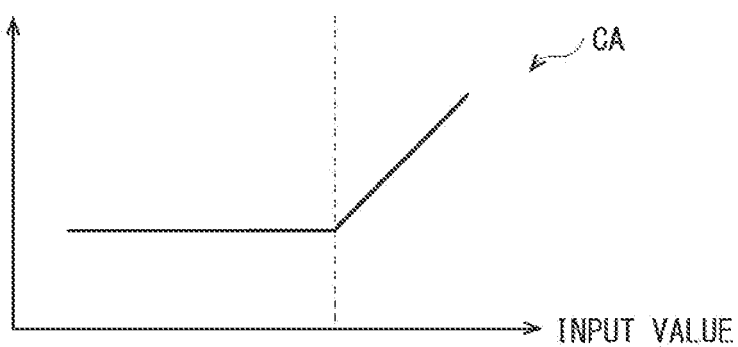
FIG. 8 is a schematic diagram illustrating a configuration example of the activation function illustrated in FIG. 6.

FIG. 5 schematically illustrates an outline of an update process of a filter FL to be used in a convolution calculation, which will be described later. FIG. 6 schematically illustrates an application example of the convolution calculation and an activation function at the feature quantity extractor 122 to be described later. FIG. 7 schematically illustrates an example process of the convolution calculation illustrated in FIG. 6. FIG. 8 schematically illustrates a configuration example of the activation function illustrated in FIG. 6.

First, at the feature quantity extractor 122, as illustrated in FIG. 5, for example, calculations including the convolution calculation using the filter FL to be described later may be performed on the received captured image P to thereby obtain a result of inference of object recognition (e.g., a result of extraction of the feature quantity F in the foregoing image region R) by machine learning. The result of inference thus obtained may be compared with ground truth data of the object recognition (see the broken-line arrow CF in FIG. 5) at any time or as needed, and an update process of a parameter of the filter FL (i.e., each filter value to be described later) may be performed at any time or as needed to cause a difference between the result of inference and the ground truth data to be smaller. Thus, the update process of each filter value of the filter FL may be performed every time the filter FL is updated by machine learning, and a trained model of the machine learning may be generated thereby.

In this way, instead of defining a specific processing formula like an existing rule-based development technique, a large number of pieces of training data for machine learning and a large number of pieces of ground truth data corresponding to the respective pieces of training data may be prepared to repeat the above-described update process. This makes it possible to finally obtain an inference result that matches the ground truth data.

Thereafter, using the trained model thus obtained, as illustrated in FIG. 6, for example, the feature quantity extractor 122 may perform multiple kinds of calculation processes based on the received captured image P multiple times, thereby performing object recognition (e.g., extraction of the feature quantity F) in each image region R in the captured image P. In one example, as the foregoing multiple kinds of calculation processes, the feature quantity extractor 122 may perform a convolution calculation CN using the foregoing filter FL and a calculation using an activation function CA alternately multiple times (see FIG. 6).

As illustrated in FIG. 7, for example, the foregoing convolution calculation CN may be performed in the following manner. First, the feature quantity extractor 122 may define a region having a predetermined size in the captured image P including multiple pixels PX that are two-dimensionally arranged in a matrix. In this example, the predetermined size may be 3 pixels by 3 pixels. Further, the feature quantity extractor 122 may perform a weighted summation of the nine pixel values in the defined region, with nine filter values in the filter FL as weighting coefficients. In this example, the nine pixel values in the defined region may each be "0" or "1". As a result of the weighting summation, a value of the feature quantity F in the region is obtainable. The value of the feature quantity F may be four in this example. Note that in the example illustrated in FIG. 7, the filter values in the filter FL each denoted as "×0" or "×1" may be two-dimensionally arranged in a matrix of three along a row direction or an x-axis direction by three along a column direction or a y-axis direction to make the total number equal to nine. The feature quantity extractor 122 may define the regions one by one in the captured image P by shifting the last defined region by one pixel, and may perform a weighted summation using the above-described filter FL for each of the defined regions individually to thereby calculate the value of the feature quantity F of each region one by one. The feature quantity F including the multiple pixels PX that are two-dimensionally arranged in a matrix as illustrated in FIG. 7, for example, may thus be extracted. Note that the foregoing filter FL may be separately set for each execution of the convolution calculation CN illustrated in FIG. 6, for example.

As illustrated in FIG. 8, for example, the calculation using the foregoing activation function CA may be performed in the following manner. Applying the activation function CA as illustrated in FIG. 8, for example, to an input value (i.e., a value of each pixel PX of the feature quantity F obtained by the corresponding convolution calculation CN) results in an output value after application of the activation function CA. In the example of FIG. 8, the output value may be set at a fixed value such as "0" in a case where the input value is less than a predetermined value, whereas in a case where the input value is greater than or equal to the predetermined value, the output value may be set to linearly increase in accordance with the magnitude of the input value.

The feature quantity F finally obtained by performing the multiple kinds of calculation processes multiple times may be supplied from the feature quantity extractor 122 to the object identifier 123 (see FIG. 1).

The object identifier 123 identifies an object in the captured image P (i.e., each of the one or more image regions R described above) on the basis of the feature quantity F extracted by the feature quantity extractor 122. For example, in a case where the image in the image region R represents a vehicle, the feature quantity F may include the features of the vehicle; and in a case where the image in the image region R represents a human, the feature quantity F may include the features of the human. The object identifier 123 thus identifies the object in each of the image regions R on the basis of the feature quantity F.

The object identifier 123 may thereafter assign, to each of the image regions R, a category indicating what the object is. For example, in a case where the object in the image in any of the image regions R is a vehicle, the object identifier 123 may assign a category representing a vehicle to the image region R. In a case where the object in the image in any of the image regions R is a human, the object identifier 123 may assign a category representing a human to the image region R.

The vehicle control processor 13 may perform various kinds of vehicle control on the vehicle 10 on the basis of the result of object identification by the object identifier 123, that is, the result of object recognition at the image processing apparatus 12 (see FIG. 1). In one example, the vehicle control processor 13 may perform travel control on the vehicle 10, operation control on any of various components of the vehicle 10, or another kind of vehicle control on the basis of the result of object identification or object recognition.

Like the image processing apparatus 12, the vehicle control processor 13 may include one or more processors or CPUs each executing a program, and one or more memories communicably coupled to the one or more processors. As in the image processing apparatus 12, these memories may each include, for example, a RAM that temporarily holds processing data, and a ROM that contains the program.

Operations, workings, and some example effects of the present example embodiment will now be described in detail in comparison with comparative examples.

Figure 9:
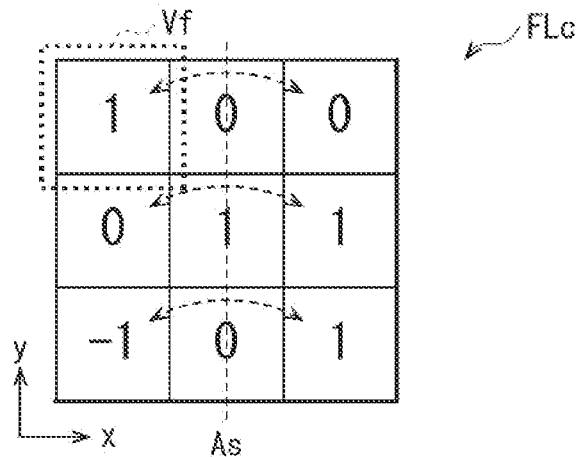
FIG. 9 is a schematic diagram illustrating a configuration example of a filter according to Comparative Example 1.
Figure 10A:
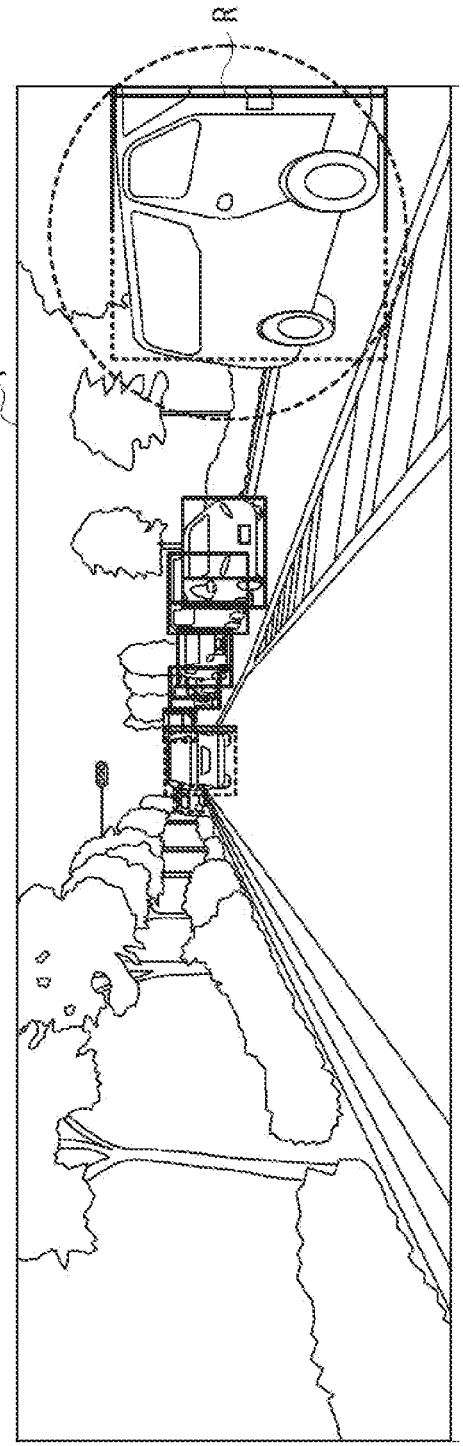
FIGS. 10A and 10B are schematic diagrams illustrating an example of results of object recognition according to Comparative Example 2.
Figure 10B:
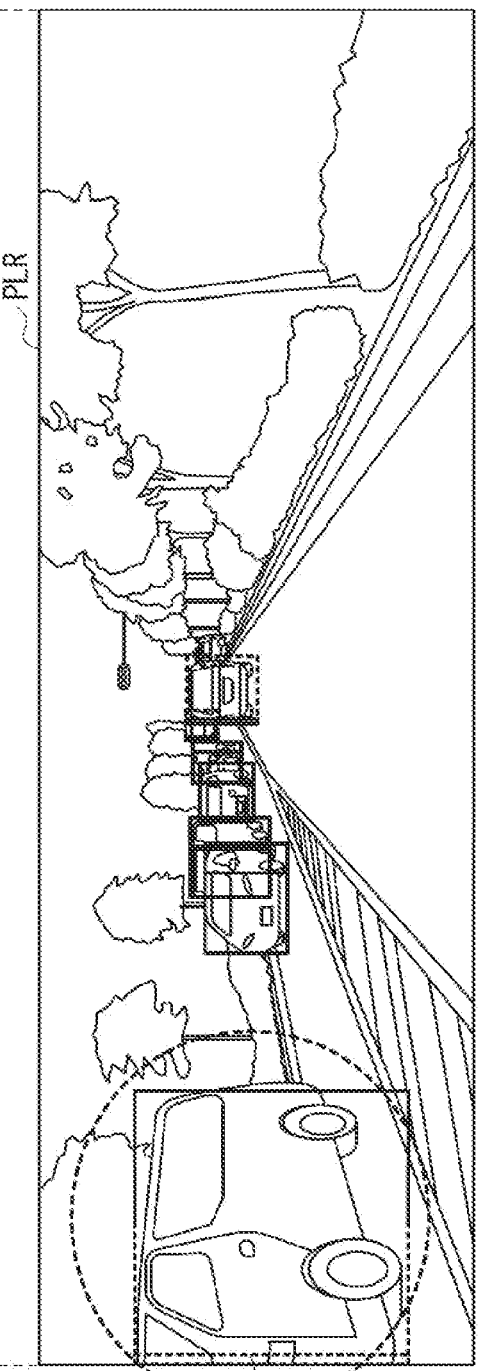

FIG. 9 schematically illustrates a configuration example of a typical filter FLc according to Comparative Example 1. FIGS. 10A and 10B schematically illustrate an example of results of object recognition or object identification according to Comparative Example 2.

The filter FLc of Comparative Example 1 illustrated in FIG. 9 may include multiple filter values Vf that are set at any values, unlike the filter FL according to the present example embodiment (see FIGS. 11 and 12) to be described later. In one example, the filter values Vf of the filter FLc of Comparative Example 1 are not line-symmetric or horizontally symmetric with respect to a predetermined axis of symmetry As (see the broken-line arrows in FIG. 9). This is in contrast to the filter FL of the present example embodiment to be described later.

The convolution calculations in a DNN described above typically have some issues, as described below.

First, as described above, a filter for a convolution calculation is typically provided separately for each of multiple executions of the convolution calculation. Accordingly, the number of parameters (i.e., the number of values represented by the filter values Vf) set for each filter is very large (e.g., the order of several millions) in an entire trained model. This makes it difficult to lighten the processing model or the trained model in performing image processing or object recognition, resulting in high difficulty of, for example, small-scale hardware implementation, such as integration. To address this issue, for example, an approach such as reducing the model size itself or reducing accuracy of the convolution calculation is conceivable; however, there is a trade-off with model performance or recognition performance.

Further, it is desired that the object recognition performance be horizontally symmetric because travel environments for vehicles (i.e., whether vehicles should travel on the left side or should travel on the right side) are generally different from country to country. In convolution calculations in a typical DNN, however, the object recognition performance is horizontally asymmetric. This makes it necessary that individual evaluation works be performed upon machine learning for both of a case of the left-side travel environment and a case of the right-side travel environment, resulting in an increased number of evaluation steps.

To address this, some approaches are conceivable including performing training with artificially prepared horizontally flipped images in machine learning. However, even with such an approach, there may be a case where strict horizontal symmetry is not achievable, as in Comparative Example 2 to be described later, for example. In such a case, an increase in the number of evaluation steps will result.

For example, according to the results of object recognition in Comparative Example 2 illustrated in FIGS. 10A and 10B, in the case where the travel environment for vehicles in the original captured image P was the left-side travel environment (see FIG. 10A), the result of object recognition on an artificially prepared horizontally flipped image PLR (see FIG. 10B) was as described below. In FIGS. 10A and FIG. 10B, the image region R that was defined in performing object recognition is illustrated partly in solid lines and partly in broken lines. The solid-line portion of the image region R corresponds to a front portion of a recognized vehicle, and the broken-line portion of the image region R corresponds to a rear portion of the recognized vehicle.

According to the result of object recognition on the original captured image P illustrated in FIG. 10A, the front portion and the rear portion of the recognized vehicle were accurately recognized, as seen from the image region R encircled in a broken line, for example. In contrast, according to the result of object recognition on the horizontally flipped image PLR illustrated in FIG. 10B, the object recognition was partly inaccurate, unlike the case with the original captured image P. To be more specific, as seen from the image region R encircled in a broken line in FIG. 10B, for example, the front portion and the rear portion of the recognized vehicle were reversed. It is thus seen that in the case of Comparative Example 2 illustrated in FIGS. 10A and 10B, the object recognition performance was not horizontally symmetric.

Thus, it may be difficult with each of Comparative Examples 1 and 2 to achieve lightening of the processing model or trained model in performing image processing or object recognition and to secure symmetry of performance described above.

To address this issue, in the present example embodiment, initial setting and an update process of the filter FL may be performed in the following manner.

Figure 11:
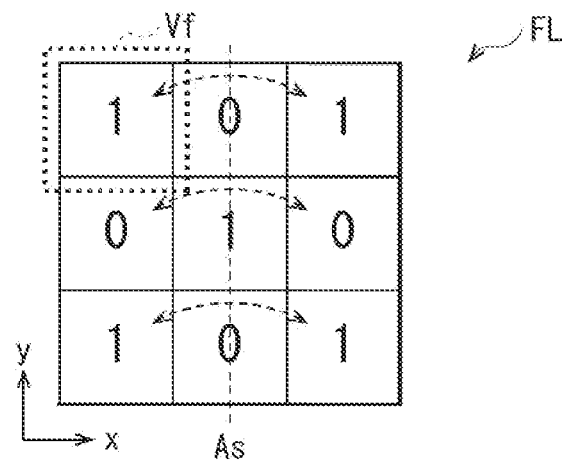
FIG. 11 is a schematic diagram illustrating a configuration example of a filter in an initial setting state according to one example embodiment.
Figure 12:
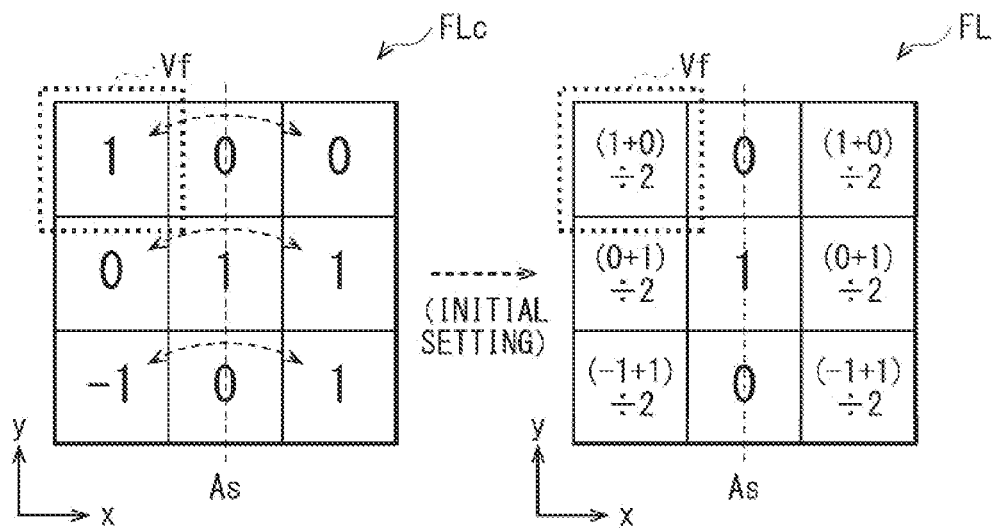
FIG. 12 is a schematic diagram illustrating an example process in performing the initial setting of the filter illustrated in FIG. 11.

In the filter FL of the present example embodiment, first, as illustrated in FIGS. 11 and 12, for example, the multiple filter values Vf may be initially set as below, unlike the filter FLc of Comparative Example 1. FIG. 11 schematically illustrates a configuration example of the filter FL in an initial setting state before machine learning (i.e., a preliminary stage of an update process of the filter FL by machine learning) according to the present example embodiment. FIG. 12 schematically illustrates an example process in performing the initial setting of the filter FL (i.e., an example process of initialization of the filter FL) illustrated in FIG. 11.

In the filter FL of the present example embodiment, as illustrated in FIG. 11, for example, the multiple filter values Vf are initially set at values that are line-symmetric with respect to the axis of symmetry As along a predetermined direction (the y-axis direction in this example). In this example, the line symmetry may be horizontal symmetry with respect to the axis of symmetry As (i.e., symmetry along the x-axis direction), and the multiple filter values Vf may be initially set at horizontally symmetric values (see the broken-line arrows in FIG. 11).

Such initial setting (i.e., setting of the above-described line symmetry) of the filter values Vf may be performed in the following manner, as illustrated by the broken-line arrows and calculation expressions (division expressions) in FIG. 12, for example. The initial setting of the filter values Vf may be performed by updating every two filter values Vf located at two line-symmetric positions (or two horizontally symmetric positions in this example) with respect to the foregoing axis of symmetry As to an average value of the two filter values Vf located at the two line-symmetric positions.

In the present example embodiment, processing on learning data for machine learning, that is, processing such as the image-flipping described above, may be performed in the following manner in an update process of the filter FL initially set as described above.

Figure 13:
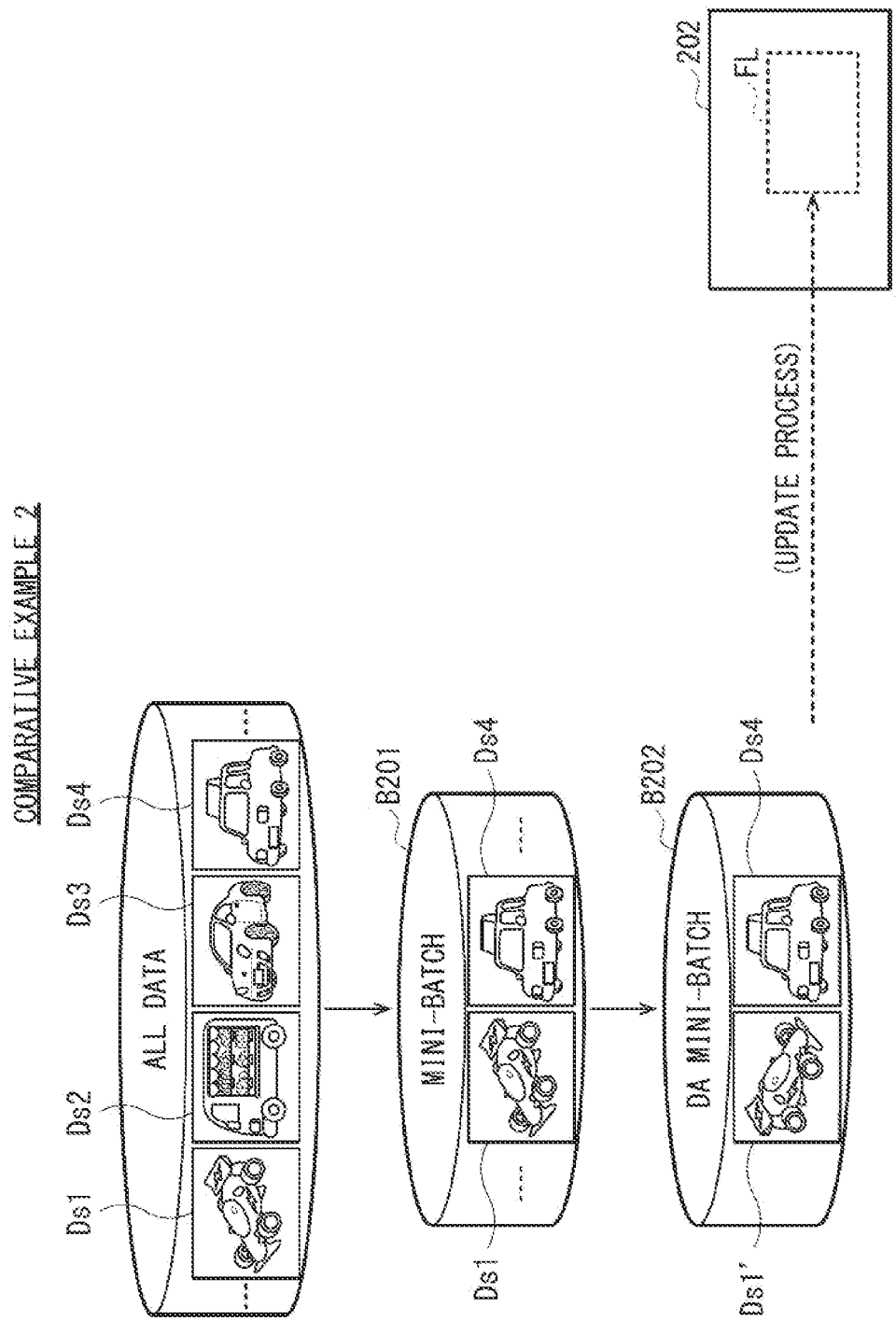
FIG. 13 is a schematic diagram illustrating an example of processing on learning data to be used in an update process of a filter according to Comparative Example 2.
Figure 14:
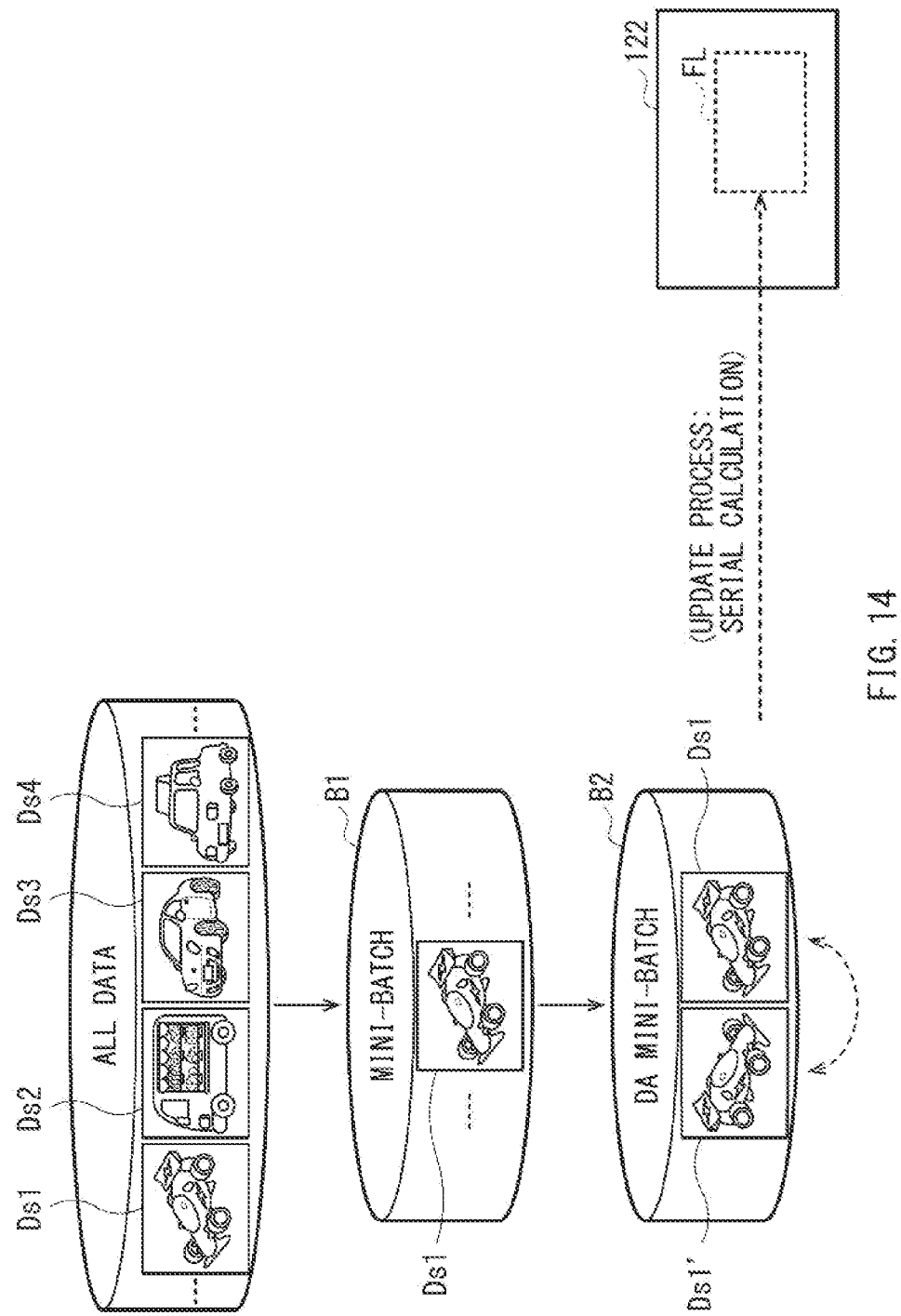
FIG. 14 is a schematic diagram illustrating an example of processing on learning data to be used in an update process of the filter according to one example embodiment.

FIG. 13 schematically illustrates an example of processing on learning data to be used in an update process of the filter FL according to Comparative Example 2 described above. FIG. 14 schematically illustrates an example of processing on learning data to be used in an update process of the filter FL according to the present example embodiment.

In Comparative Example 2 illustrated in FIG. 13, initially, any multiple pieces of learning data extracted first from all pieces of the learning data (about one million pieces of data including learning data Ds1 to Ds4 in this example) may each be included in a mini-batch B201. The number of pieces of data in the mini-batch B201 may be about ten, for example. In the example illustrated in FIG. 13, the mini-batch B201 may include the learning data Ds1 and Ds4. Next, learning data resulting from applying horizontal image-flipping to the learning data in the mini-batch B201 with a certain probability may become included in a data augmentation (DA) mini-batch B202 for augmentation of learning data. In the example illustrated in FIG. 13, the DA mini-batch B202 may include the learning data Ds4 and learning data Ds1'. The learning data Ds1' may be data resulting from applying horizontal image-flipping to the learning data Ds1. An update process may be performed on the initially set filter FL in a feature quantity extractor 202 by using such learning data Ds1' and Ds4 (see the broken-line arrow in FIG. 13, for example).

Thus, according to the technique of Comparative Example 2, unlike the technique of the present example embodiment to be described later, the data in the DA mini-batch B202 may not always include any unflipped image and an image resulting from flipping the same image as paired images. In the example illustrated in FIG. 13, the learning data Ds1' and the learning data Ds4 do not correspond to unflipped and flipped images (i.e., an image before flipping and an image resulting from flipping the same image). Accordingly, in Comparative Example 2, the symmetry (i.e., horizontal symmetry) of the filter values Vf achieved by the initial setting of the filter FL may be impaired upon the update of the filter FL, and this makes it difficult to strictly secure line-symmetric (horizontally symmetric) performance of object recognition. In other words, the technique of Comparative Example 2 may serve to secure line-symmetric performance of object recognition to some extent as compared with the technique of Comparative Example 1 described above, but may be insufficient to strictly secure the line symmetry.

In contrast, according to the example embodiment illustrated in FIG. 14, initially, any multiple pieces of learning data extracted from all pieces of the learning data (about one million pieces of data including learning data Ds1 to Ds4) may each be included in a mini-batch B1, as with Comparative Example 2 described above. The number of pieces of data in the mini-batch B1 may be about ten, for example. In the example illustrated in FIG. 14, the mini-batch B1 may include the learning data Ds1. Next, learning data resulting from applying horizontal image-flipping to the learning data in the mini-batch B1 may become included in a DA mini-batch B2 for augmentation of learning data. In the example illustrated in FIG. 14, the DA mini-batch B2 may include the learning data Ds1 and learning data Ds1' as paired images, the learning data Ds1' resulting from applying image-flipping to the learning data Ds1 (see the two-headed broken-line arrow in FIG. 14). An update process may be performed on the initially set filter FL in the feature quantity extractor 122 by using such learning data Ds1' and Ds1 as the paired images (see the broken-line arrow in FIG. 14, for example). In the present example embodiment, as illustrated in FIG. 14, the update process of the filter FL by machine learning may be executed by serial calculation, for example.

In one embodiment, the learning data in the DA mini-batch B2 described above may serve as "augmentation batch data". In one embodiment, the learning data Ds1 described above may serve as an "unflipped image", and the learning data Ds1' may serve as a "flipped image".

Thus, according to the technique of present example embodiment, unlike the technique of Comparative Example 2 described above, the learning data in the DA mini-batch B2 includes unflipped and flipped images (e.g., the learning data Ds1 and Ds1' described above), that is, any image or learning data before flipping and an image or learning data resulting from flipping the same image or learning data, as paired images. Thus, in the present example embodiment, unlike Comparative Example 2, the learning data Ds1 and the learning data Ds1' as paired images respectively correspond to an unflipped image and a flipped image (i.e., an image before flipping and an image resulting from flipping the same image), and such unflipped and flipped images are always included as paired images in the learning data in the DA mini-batch B2. Accordingly, in the present example embodiment, the symmetry (i.e., line symmetry) of the filter values Vf achieved by the initial setting of the filter FL remains unimpaired even upon the update process of the filter FL, unlike Comparative Example 2, as will be described in detail later.

In the filter FL of the present example embodiment, as illustrated in FIGS. 11 and 12, for example, the multiple filter values Vf may be initially set at horizontally symmetric values, and the flipped image (the learning data Ds1') may be a horizontally flipped image from the unflipped image (the learning data Ds1).

This allows, in the present example embodiment, horizontal symmetry to be secured regarding the result of object identification or object recognition by the object identifier 123. In one example, horizontal symmetry is securable regarding the result of object identification by the object identifier 123 in both of a case where the travel environment for the vehicle 10 is the left-side travel environment and a case where the travel environment for the vehicle 10 is the right-side travel environment.

The present example embodiment thus achieves the following, unlike the case of, for example, Comparative Example 2 described above. That is, even in a case of object recognition on the horizontally flipped image PLR as illustrated in, for example, FIG. 10B, the present example embodiment achieves a result of the object recognition similar to that on the original captured image P illustrated in FIG. 10A, unlike the case of Comparative Example 2 described above.

As described above, in the present example embodiment, the feature quantity F included in the captured image P is extracted by execution of the convolution calculation using the filter FL including the multiple filter values Vf that are two-dimensionally arranged. The multiple filter values Vf in the filter FL are initially set at values that are line-symmetric with respect to the axis of symmetry As along the predetermined direction.

As a result, the present example embodiment achieves a reduction in the number of parameters included in the filter FL, i.e., the number of values represented by the filter values Vf, as compared with the case of Comparative Example 1 described above in which the multiple filter values Vf are not line-symmetric, that is, the multiple filter values Vf are set to any values. In the examples of FIGS. 11 and 12 described above, for example, the number of parameters in the filter FL of the present example embodiment is reduced to about one half that in the filter FLc of Comparative Example 1.

Further, according to the present example embodiment, the foregoing DA mini-batch B2 (i.e., the augmentation batch data of learning data) is configured to include the unflipped and flipped images described above (e.g., the learning data Ds1 and Ds1' described above), that is, any image or learning data before flipping and an image or learning data resulting from flipping the same image or learning data, as the paired images.

As a result, in performing object identification or recognition based on the feature quantity F extracted, for example, the present example embodiment achieves the following. That is, the symmetry (i.e., horizontal symmetry) of the filter values Vf achieved by the initial setting of the filter FL described above remains unimpaired even upon the update process of the filter FL, and the line symmetry of object recognition performance is thus strictly secured. This is in contrast to the case of Comparative Example 1 above, and the case of Comparative Example 2 described above in which the data in the DA mini-batch B202 may not always include any unflipped image and an image resulting from flipping the same image as the paired images.

From the foregoing, the present example embodiment makes it possible to achieve lightening of the processing model or trained model in performing image processing or object recognition and to secure symmetry of performance.

Note that as will be described later with reference to an Example and the comparative examples, line symmetry in performing object identification is achievable to some extent with the technique of Comparative Example 2. Further, if comparisons are made between the technique of Comparative Example 2 and the technique of the present example embodiment illustrated in FIGS. 13 and 14, respectively, a substantial number of pixels (the number of pieces of learning data) per DA mini-batch B2 in the present example embodiment (i.e., substantially one) is smaller than the number of pixels per DA mini-batch B202 in Comparative Example 2 (i.e., one). Accordingly, the technique of the present example embodiment may result in a decrease in learning rate as compared with the technique of Comparative Example 2. Thus, in machine learning, employing a technique like that of the present example embodiment may not generally seem to provide great advantage that would justify lowering the learning rate. However, the foregoing initial setting of the filter FL in the present example embodiment is intended to meet, for example, demands to secure line symmetry or horizontal symmetry in a very strict sense in performing object identification, and demands to improve hardware implementability by reducing the number of parameters of a final model. The technique of the present example embodiment is thus expected to provide great advantage under such demands.

Further, in the present example embodiment, the initial setting of the filter values Vf may be performed by updating every two filter values Vf located at two line-symmetric positions with respect to the foregoing axis of symmetry As to the average value of the two filter values Vf located at the two line-symmetric positions. This makes it possible to easily perform the process of initially setting the filter values Vf at line-symmetric values.

Moreover, in the present example embodiment, the update process of the filter FL by machine learning may be executed by serial calculation as described above, for example. This makes it possible to achieve the following advantages. In machine learning with a DNN, parallel calculation by a graphics processing unit (GPU) is typically employed for faster learning. It is known, however, that such parallel calculation typically results in some numerical error. Due to the influence of the numerical error resulting from the parallel calculation, it can become difficult to secure the foregoing line-symmetric performance in performing object identification. By employing the serial calculation as described above, the present example embodiment makes it possible to avoid the influence of the numerical error, thus making it easier to secure the line-symmetric performance in performing object identification, although there is a slight reduction in learning rate. As a result, according to the present example embodiment, it is possible to secure the foregoing symmetry of performance with higher reliability.

In addition, in the present example embodiment, the image processing apparatus 12 may be mounted on the vehicle 10, and the foregoing line symmetry of the filter values Vf may be horizontal symmetry with respect to the foregoing axis of symmetry As. Further, the multiple filter values Vf may be set at horizontally symmetric values, and the flipped image (the learning data Ds1') may be a horizontally flipped image from the unflipped image (the learning data Ds1). In addition, as described above, regarding the result of object identification by the object identifier 123, horizontal symmetry may be secured for both of the case where the vehicle 10 is in the left-side travel environment and the case where the vehicle 10 is in the right-side travel environment. By virtue of the horizontal symmetry of object recognition performance being secured for both the left-side travel environment and the right-side travel environment, it is possible to improve convenience and also achieve commonality of evaluation works in machine learning to thereby reduce the number of steps of evaluation.

A detailed description will now be given of an Example according to the foregoing example embodiment while making comparisons with the foregoing Comparative Examples 1 and 2 as appropriate.

Figure 15:
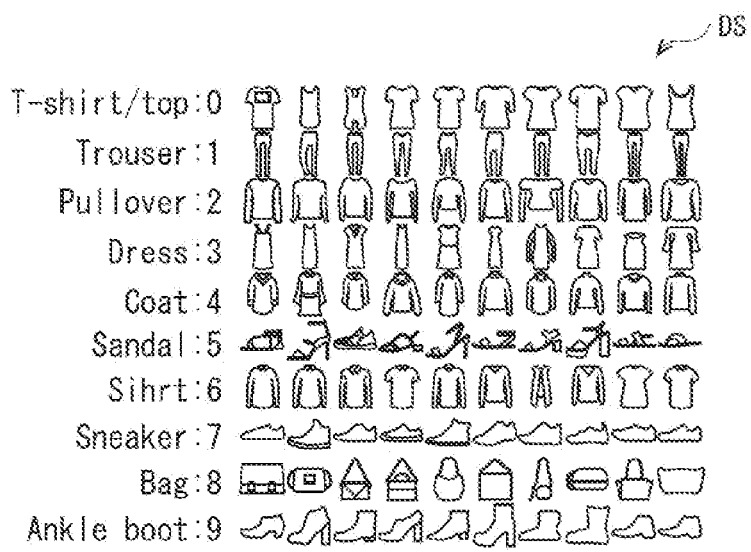
FIG. 15 is a schematic diagram illustrating a configuration example of a data set according to one Example.
Figure 17:
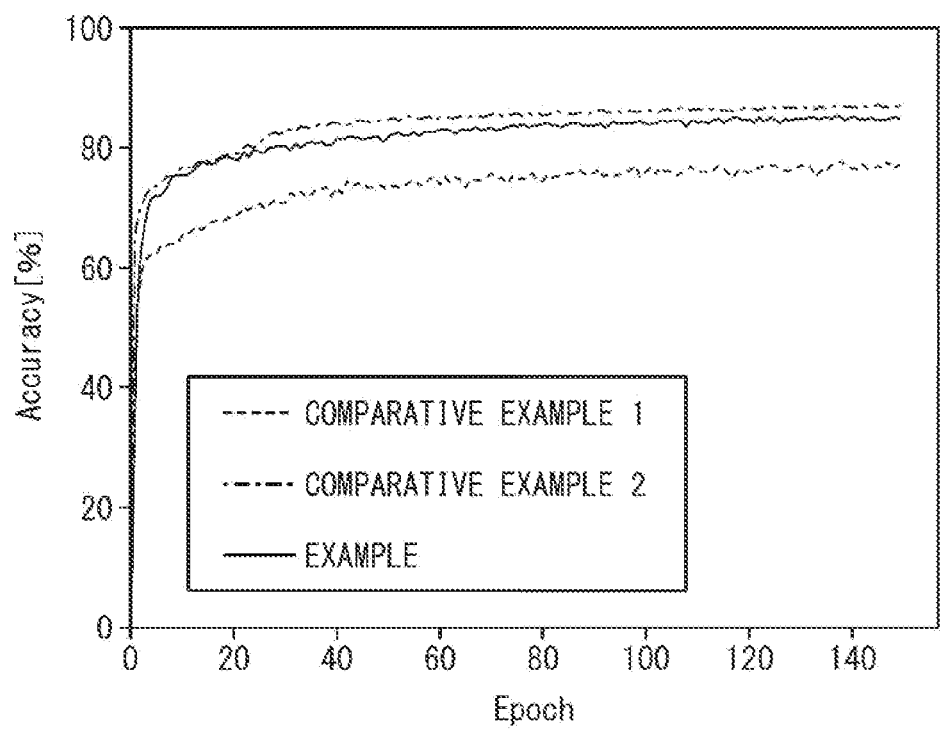
FIG. 17 is a diagram illustrating an example of respective results of object recognition according to Comparative Examples 1 and 2 and one Example.
Figure 18:
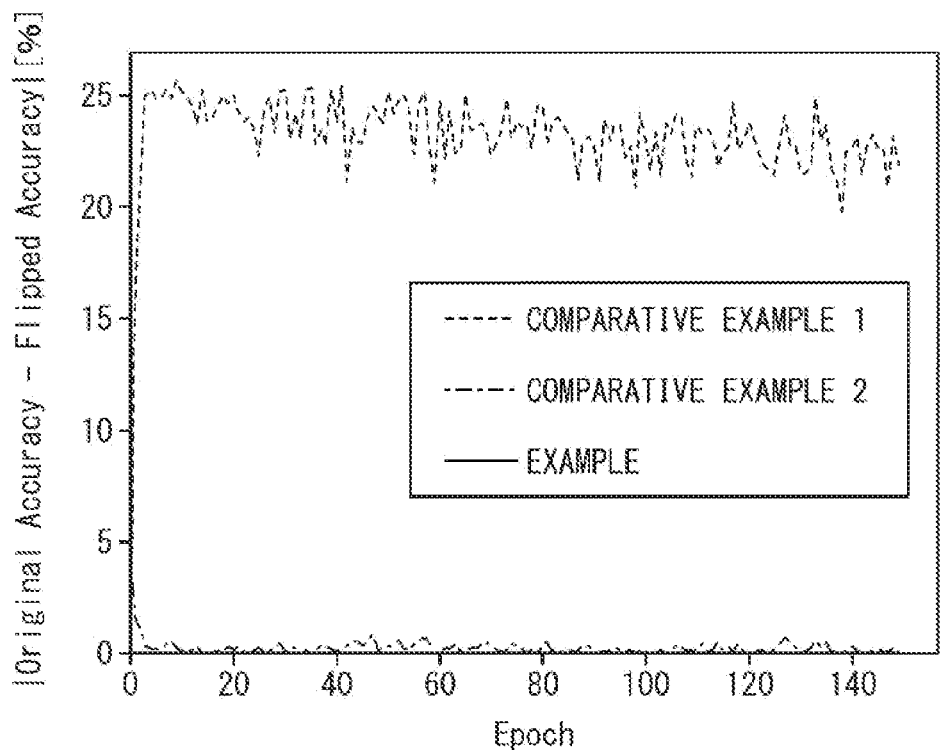
FIG. 18 is a diagram illustrating another example of the respective results of object recognition according to Comparative Examples 1 and 2 and one Example.
Figure 19:
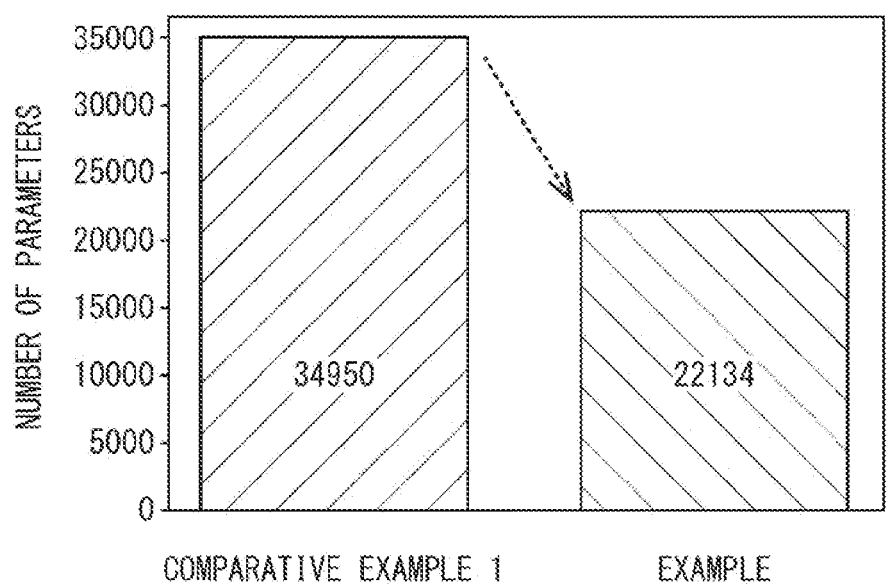
FIG. 19 is a diagram illustrating an example of respective numbers of parameters according to Comparative Example 1 and one Example.

FIG. 15 schematically illustrates a configuration example of a data set DS according to the Example. FIG. 16 is a schematic diagram illustrating a configuration example of a machine learning model (i.e., a trained model of a DNN) according to the Example. Note that the configuration examples illustrated in FIGS. 15 and 16 apply also to Comparative Examples 1 and 2. FIGS. 17 and 18 illustrate respective examples of results of object recognition (i.e., results of evaluations (1) and (2) to be described later) for each of Comparative Examples 1 and 2 and the Example. For example, in FIG. 17, the horizontal axis represents the number of epochs, and the vertical axis represents accuracy. In FIG. 18, the horizontal axis represents the number of epochs, and the vertical axis represents an absolute value of a difference between accuracy with an original captured image and accuracy with a horizontally flipped image (|Original Accuracy—Flipped Accuracy|). FIG. 19 illustrates an example of the respective numbers of parameters (i.e., results of evaluation (3) to be described later) according to Comparative Example 1 and the Example.

Comparative Examples 1 and 2 and the Example illustrated in FIGS. 15 to 19 represent examples of the following object recognition technique by machine learning, as described above.

Comparative Example 1: Typical object recognition technique by machine learning (An example of convolution calculation using the filter FLc of Comparative Example 1 illustrated in FIG. 9)

Comparative Example 2: Object recognition technique including training on a horizontally flipped image in addition to an original captured image in machine learning (A technique using the example of processing on learning data illustrated in FIG. 13) Example: Object recognition technique using the initial setting and the update process of the filter FL according to the present example embodiment (see the filter FL illustrated in FIG. 11 and the example of processing on learning data illustrated in FIG. 14.)

In object recognition by machine learning in the Example and Comparative Examples 1 and 2, images of clothing articles in a known data set DS (Fashion-MNIST data set) schematically illustrated in FIG. 15 were used to handle classification problems for ten classes. Further, a model illustrated in FIG. 16 was used as a machine learning model according to each of the Example and the comparative examples. That is, a neural network including a total of (20+1) layers with alternate combinations of the convolution calculation CN and the activation function CA described above was used. Then, three kinds of evaluations (Evaluations (1) to (3)) were performed on the Example and the comparative examples. The results of the evaluations are described below.

First, the results of Evaluation (1) illustrated in FIG. 17 indicate that the Example and Comparative Example 2 were higher in accuracy, that is, higher in object recognition performance than Comparative Example 1. The Example and Comparative Example 2 were substantially equivalent in performance.

Next, the results of Evaluation (2) illustrated in FIG. 18 indicate that the difference in accuracy described above, that is, the absolute value of the difference between the accuracy with the original captured image and the accuracy with the horizontally flipped image was much larger in Comparative Example 1 than in the Example and Comparative Example 2. A reason for this is considered to be that Comparative Example 1 is an example of typical machine learning and is therefore horizontally asymmetric in object recognition performance, as described above. For Comparative Example 2, the difference in accuracy was small but was not completely "zero", which indicates that the object recognition performance was not completely horizontally symmetric. In contrast to Comparative Examples 1 and 2, the Example constantly achieved "zero" for the above-described difference in accuracy, which indicates that the object recognition performance was completely horizontally symmetric, in other words, horizontal symmetry of object recognition performance was secured.

Next, the results of Evaluation (3) illustrated in FIG. 19 indicate that the Example achieved a reduction in the number of parameters included in the filter used in the convolution calculation, that is, the number of values represented by the filter values Vf, as compared with Comparative Example 1 (see the broken-line arrow in FIG. 19). In this example, the number of parameters in Comparative Example 1 was "34950", whereas the number of parameters in the Example was "22134". Thus, the number of parameters was reduced in the Example to about 63% that of Comparative Example 1.

From the foregoing, it was actually confirmed that according to the present example embodiment, line-symmetric (horizontally symmetric) performance of object recognition was secured and the foregoing number of parameters was reduced to about one half, as compared with Comparative Examples 1 and 2. It is to be noted that the foregoing data set used in the Example and the comparative examples is a mere example, and even in a case where a different data set was used, evaluation results (i.e., results of object recognition) similar to the above-described results were obtained with the Example and the comparative examples.

Although some embodiments of the technology including the foregoing example embodiment and the Example, which will hereinafter be collectively referred to as "example embodiments", have been described hereinabove, the technology is not limited to those example embodiments, and various modifications may be made thereto without departing from the scope of the technology.

For example, the configurations, including type, shape, arrangement, material, and the number of pieces, of respective components of the vehicle 10 and the image processing apparatus 12 are not limited to those described in the example embodiments. The configuration of each of the components may be modified by employing any other type, shape, arrangement, material, number of pieces, etc. In addition, values, ranges, magnitude relationships, etc., of various parameters described in the example embodiments are non-limiting, and any other values, ranges, magnitude relationships, etc. may be employed.

For example, in the example embodiments above, the stereo camera 11 may capture images of the front view from the vehicle 10; however, this is non-limiting, and the stereo camera 11 may capture images of the side view or rear view from the vehicle 10. Further, although an example case of using the stereo camera 11 has been described in the example embodiments above, this is non-limiting. Alternatively, for example, a monocular camera may be used to perform various processes described in the example embodiments above.

Further, although examples of the various processes to be performed at the vehicle 10 or the image processing apparatus 12 have been described in the example embodiments above, such examples are non-limiting, and other techniques may be used to perform those processes. For example, techniques to perform the foregoing initial setting and update process of the filter FL are not limited to those described in the example embodiments above, and other techniques may be used. For example, in the example embodiments above, the line symmetry (horizontal symmetry) with respect to the axis of symmetry along the y-axis direction (column direction) has been described as an example; however, this is non-limiting. Alternative examples include line symmetry (vertical symmetry) with respect to an axis of symmetry along the x-axis direction (the row direction), and line symmetry with respect to an axis of symmetry along a diagonal direction. Further, any technique other than the technique described in the example embodiments above may be used to set the filter values at line-symmetric values. Furthermore, although an example case in which the update process of the filter FL by machine learning may be executed by serial calculation has been described in the example embodiments above, this is non-limiting. Alternatively, for example, the update process of the filter FL by machine learning may be executed by parallel calculation. In addition, although an example case in which the convolution calculation is performed multiple times has been described in the example embodiments above, this is non-limiting. Alternatively, for example, the convolution calculation may be performed only once and another calculation technique may be combined with the convolution calculation to thereby extract the feature quantity.

The series of processes described in the example embodiments above may be performed by hardware such as circuitry, or by software such as a program. In a case where the series of processes is to be performed by software, the software may include a group of programs for causing a computer to execute various operations. Each program may be a built-in program that is incorporated in the computer in advance for use. Each program may also be installed in the computer from a network or a computer-readable medium for use, for example.

Further, although an example case in which the image processing apparatus 12 may be mounted on the vehicle has been described in the example embodiments above, this is non-limiting. Alternatively, for example, the image processing apparatus 12 may be mounted on a movable body other than a vehicle, or on equipment other than a movable body.

Furthermore, the various examples described above may be applied in any combination. The technology encompasses an embodiment based on such a combination as well.

The effects described herein are mere examples and non-limiting. Any embodiment may achieve other effects.

It is possible to achieve at least the following configurations from the foregoing embodiments and modification examples of the technology.

An image processing apparatus including:
an extractor configured to extract a feature quantity included in a captured image; and
an object identifier configured to identify an object on the basis of the feature quantity, in which
the extractor is configured to extract the feature quantity by performing, on the basis of the captured image, a convolution calculation multiple times using a filter including multiple filter values that are two-dimensionally arranged,
the multiple filter values of the filter are initially set at values that are line-symmetric with respect to an axis of symmetry along a predetermined direction, and
augmentation batch data of learning data to be used in an update process of the filter by machine learning is configured to include any unflipped image extracted and a flipped image as paired images, the flipped image resulting from applying image-flipping to the unflipped image with respect to the axis of symmetry.

The image processing apparatus according to (1), in which the initial setting of the multiple filter values is executable by updating every two of the filter values located at two line-symmetric positions with respect to the axis of symmetry to an average value of the two filter values located at the two line-symmetric positions.

The image processing apparatus according to (1) or (2), in which the update process of the filter by the machine learning is executable by serial calculation.

The image processing apparatus according to any one of (1) to (3), in which
the image processing apparatus is mountable on a vehicle,
the line symmetry is horizontal symmetry with respect to the axis of symmetry,
the multiple filter values are initially set at the values that are horizontally symmetric, and the flipped image is a horizontally flipped image from the unflipped image, and
the image processing apparatus is configured to secure horizontal symmetry regarding
a result of the identification of the object by the object identifier in a case where a travel environment for the vehicle is a left-side travel environment, and
a result of the identification of the object by the object identifier in a case where the travel environment for the vehicle is a right-side travel environment.

A vehicle including:
an image processing apparatus; and
a vehicle control processor,
the image processing apparatus including
an extractor configured to extract a feature quantity included in a captured image, and
an object identifier configured to identify an object on the basis of the feature quantity, in which
the extractor is configured to extract the feature quantity by performing, on the basis of the captured image, a convolution calculation multiple times using a filter including multiple filter values that are two-dimensionally arranged,
the multiple filter values of the filter are initially set at values that are line-symmetric with respect to an axis of symmetry along a predetermined direction, and
augmentation batch data of learning data to be used in an update process of the filter by machine learning is configured to include any unflipped image extracted and a flipped image as paired images, the flipped image resulting from applying image-flipping to the unflipped image with respect to the axis of symmetry,
the vehicle control processor being configured to perform vehicle control on the basis of a result of the identification of the object by the object identifier.

An image processing apparatus including:
one or more processors; and
one or more memories communicably coupled to the one or more processors, in which
the one or more processors are configured to
extract a feature quantity included in a captured image, and
identify an object on the basis of the feature quantity,
the one or more processors are configured to extract the feature quantity by performing, on the basis of the captured image, a convolution calculation multiple times using a filter including multiple filter values that are two-dimensionally arranged,
the multiple filter values of the filter are initially set at values that are line-symmetric with respect to an axis of symmetry along a predetermined direction, and
augmentation batch data of learning data to be used in an update process of the filter by machine learning is configured to include any unflipped image extracted and a flipped image as paired images, the flipped image resulting from applying image-flipping to the unflipped image with respect to the axis of symmetry.

An image processing apparatus including
circuitry configured to
extract a feature quantity included in a captured image, and
identify an object on a basis of the feature quantity, in which the circuitry is configured to extract the feature quantity by performing, on the basis of the captured image, a convolution calculation multiple times using a filter including multiple filter values that are two-dimensionally arranged, the multiple filter values of the filter are initially set at values that are line-symmetric with respect to an axis of symmetry along a predetermined direction, and augmentation batch data of learning data to be used in an update process of the filter by machine learning is configured to include any unflipped image extracted and a flipped image as paired images, the flipped image resulting from applying image-flipping to the unflipped image with respect to the axis of symmetry.

The feature quantity extractor 122 and the object identifier 123 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the feature quantity extractor 122 and the object identifier 123. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the feature quantity extractor 122 and the object identifier 123 illustrated in FIG. 1.

The invention claimed is:

1. An image processing apparatus mountable on a vehicle and comprising:
   one or more processors; and
   one or more memories communicably coupled to the one or more processors, in which the one or more processors are configured to:
     extract a feature quantity included in a captured image; and
     perform identification of an object on a basis of the feature quantity, wherein
   the one or more processors are configured to extract the feature quantity by performing, on a basis of the captured image, a convolution calculation multiple times using a filter including multiple filter values that are two-dimensionally arranged,
   the multiple filter values of the filter are initially set before starting machine learning at values that are horizontally symmetric with respect to a vertical axis of symmetry along a horizontal direction, and
   augmentation batch data of learning data configured to be used in an update process of the filter by the machine learning consists of one or more unflipped images and one or more flipped images as paired images, each flipped image resulting from applying image-flipping to a corresponding one of the unflipped images with respect to the vertical axis of symmetry such that the each flipped image is a horizontally flipped image from the corresponding one of the unflipped images, wherein
   the one or more processors are configured to secure horizontal symmetry regarding:
     a result of the identification of the object in a case where a travel environment for the vehicle is a left-side travel environment, and
     a result of the identification of the object in a case where the travel environment for the vehicle is a right-side travel environment, and
   the one or more processors are configured to set the multiple filter values of the filter that are initially set before starting the machine learning by updating every two filter values of the multiple filter values located at two horizontally symmetric positions with respect to the vertical axis of symmetry and having different values to an average value of the two filter values.

2. The image processing apparatus according to claim 1, wherein the update process of the filter by the machine learning is executable by serial calculation.

3. A vehicle comprising:
   the image processing apparatus according to claim 1; and
   a vehicle control processor configured to perform vehicle control on a basis of a result of the identification of the object.

4. A vehicle comprising:
   the image processing apparatus according to claim 2; and
   a vehicle control processor configured to perform vehicle control on a basis of a result of the identification of the object.

5. An image processing apparatus comprising
   circuitry configured to
     extract a feature quantity included in a captured image, and
     identify an object on a basis of the feature quantity, wherein
   the circuitry is configured to extract the feature quantity by performing, on a basis of the captured image, a convolution calculation multiple times using a filter including multiple filter values that are two-dimensionally arranged,
   the multiple filter values of the filter are initially set before starting machine learning at values that are horizontally symmetric with respect to a vertical axis of symmetry along a horizontal direction, and
   augmentation batch data of learning data configured to be used in an update process of the filter by the machine learning consists of one or more unflipped images and one or more flipped images as paired images, each flipped image resulting from applying image-flipping to a corresponding one of the unflipped images with respect to the vertical axis of symmetry such that the flipped image is a horizontally flipped image of the unflipped image, wherein
   the circuitry is configured to secure horizontal symmetry regarding:
     a result of the identification of the object in a case where a travel environment for the vehicle is a left-side travel environment, and
     a result of the identification of the object in a case where the travel environment for the vehicle is a right-side travel environment, and
   the circuitry is configured to set the multiple filter values of the filter that are initially set before starting the machine learning by updating every two filter values of the multiple filter values located at two horizontally symmetric positions with respect to the vertical axis of symmetry and having different values to an average value of the two filter values.

\* \* \* \* \*